(12) United States Patent
Yeh

(10) Patent No.: US 7,828,312 B1
(45) Date of Patent: Nov. 9, 2010

(54) FOLDING BICYCLE

(76) Inventor: Ming-Han Yeh, No. 15, Ln. 342, Sec 2, Zhishan Road, Shilin District, Taipei City (TW) 111

( * ) Notice: Subject to any disclaimer, the term of this patent is extended or adjusted under 35 U.S.C. 154(b) by 56 days.

(21) Appl. No.: 12/464,928

(22) Filed: May 13, 2009

(51) Int. Cl.
  *B62K 19/18* (2006.01)
(52) U.S. Cl. ................................ 280/278; 280/287
(58) Field of Classification Search ............... 280/278, 280/287
  See application file for complete search history.

(56) References Cited

U.S. PATENT DOCUMENTS

| 1,545,333 | A * | 7/1925 | Kurth | 280/235 |
|---|---|---|---|---|
| 5,398,955 | A * | 3/1995 | Yeh | 280/287 |
| 6,135,668 | A * | 10/2000 | Lin | 403/322.4 |
| 6,450,519 | B1 * | 9/2002 | Wang | 280/266 |
| 7,198,281 | B2 * | 4/2007 | Huang | 280/278 |
| 7,232,143 | B1 * | 6/2007 | Ferguson | 280/278 |
| 7,264,257 | B2 * | 9/2007 | Sanders | 280/278 |
| 2002/0067020 | A1 * | 6/2002 | Wang | 280/263 |
| 2002/0167151 | A1 * | 11/2002 | Tseng | 280/287 |
| 2005/0285366 | A1 * | 12/2005 | Huang | 280/278 |
| 2006/0087095 | A1 * | 4/2006 | Huang | 280/278 |
| 2007/0120342 | A1 * | 5/2007 | Daniels | 280/287 |
| 2008/0309046 | A1 * | 12/2008 | Wang | 280/250.1 |
| 2010/0133777 | A1 * | 6/2010 | Daniels | 280/278 |

* cited by examiner

*Primary Examiner*—Lesley Morris
*Assistant Examiner*—Marlon A Arce
(74) *Attorney, Agent, or Firm*—Pearne & Gordon LLP

(57) ABSTRACT

A folding bicycle includes: a front body having a front frame and a front wheel pivotally coupled to the front frame; a rear body having a rear frame axially coupled to and freely separable from the front frame and a rear wheel pivotally coupled to the rear frame; a folding mechanism provided between the front frame and the rear frame and configured for connection thereof; and a fastening mechanism for fastening the folding mechanism to at least one of the front frame and the rear frame so as for the front frame and the rear frame to be coupled together axially, firmly, and integrally, and allowing the folding mechanism to be received in at least one of the front frame and the rear frame.

18 Claims, 9 Drawing Sheets

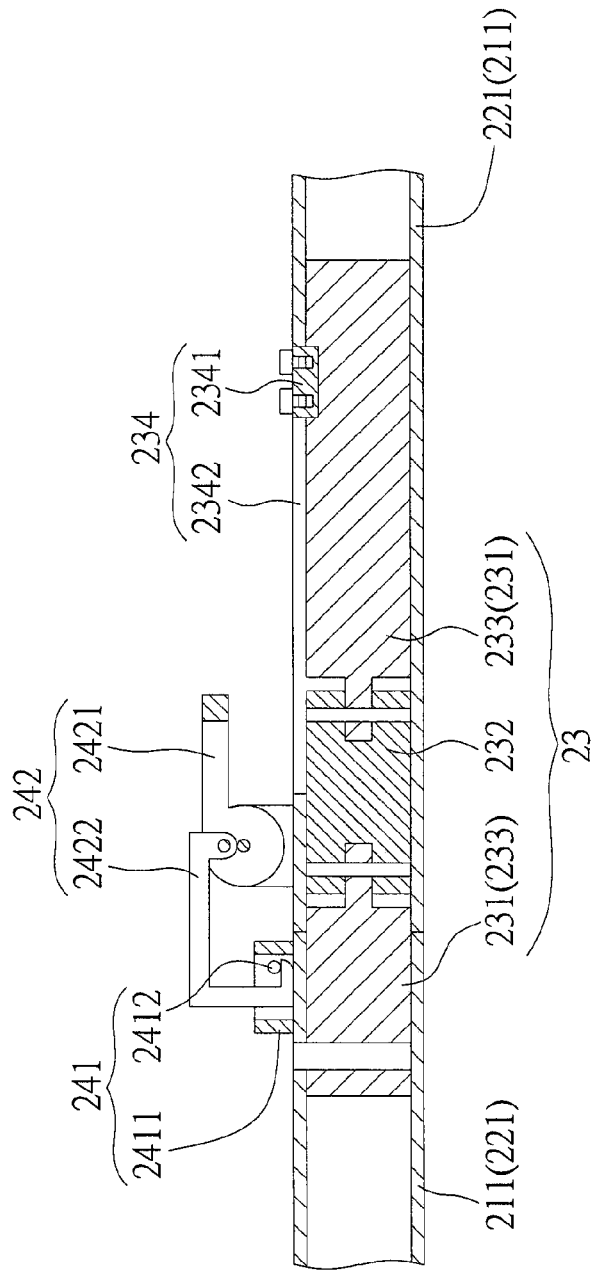
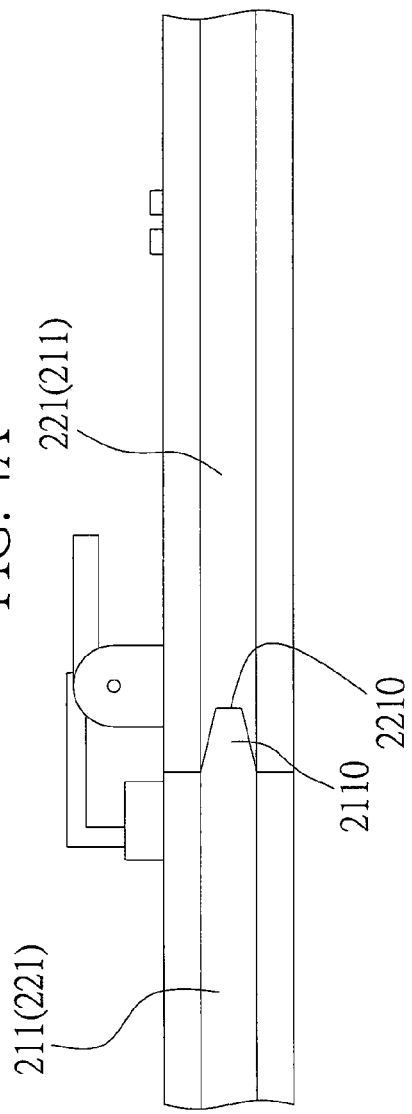
FIG. 4A
FIG. 4B

FOLDING BICYCLE

BACKGROUND OF THE INVENTION

1. Field of the Invention

The present invention relates to folding bicycles, and more particularly, to a bicycle capable of being pushed, pulled and driven after being folded.

2. Description of the Prior Art

Bicycles nowadays are among commuters' choices and sports equipment. With green consciousness on the rise, bicycles are increasingly popular with metropolitans. However, metropolitan bicyclists are confronted with bicycle-specific problems, such as limited bicycle parking areas and theft. As a result, it is not uncommon for bicycles to be parked at staircases, hallways or at home in apartments to evade thieves, though dragging typically bulky bicycles to the upper stories in an apartment is a toil to bicyclists. What is more, it is inconvenient for vacationists to deliver bicycles to the countryside to be used as sports equipment. To cope with the aforesaid problems, bicycle manufacturers developed folding bicycles which can be folded up to be carried and transported easily. Referring to FIGS. 1A and 1B, which are schematic views of a conventional folding bicycle, the conventional folding bicycle comprises a front body 11, a rear body 12, and a pivotally turning structure 13 provided between the front body 11 and the rear body 12 and configured to draw the front body 11 and the rear body 12 closer to each other so as to render the folded conventional folding bicycle compact.

However, with the front body 11 being flipped over to overlap the rear body 12, the pivotally turning structure 13 pivotally coupled to the front body 11 and the rear body 12 is inevitably exposed, compromising the integrity and appearance of the folding bicycle. Also, the pivotally turning structure 13 lacks a positioning structure, and thus the unfolded front body 11 and rear body 12 can only be aligned in an attempt, using the unreliable human eye. Unless the unfolded front body 11 and rear body 12 are in a straight line, the folding bicycle will be fragile and unsafe.

Accordingly, bicycle manufacturers nowadays are confronted with an urgent issue that involves developing a folding bicycle highly integrated and effective to position so as to enable the folding bicycle to be straightened out when unfolded and thereby overcome the aforesaid drawbacks of the prior art.

SUMMARY OF THE INVENTION

In view of the aforesaid drawbacks of the prior art, the present invention provides a folding bicycle with a folding mechanism configured to couple a front body and a rear body together and concealable in a rear frame of the rear body after the folding bicycle is unfolded.

The present invention further provides a folding bicycle capable of aligning a front body and a rear body when unfolded.

The present invention further provides a folding bicycle having a folding mechanism for coupling a front body and a rear body together and concealable in a rear frame of the rear body so as to ensure the integrity and enhance the looks of the folding bicycle.

To achieve the above and other objectives, the present invention provides a folding bicycle comprising: a front body comprising a front frame and a front wheel pivotally coupled to the front frame; a rear body comprises a rear frame axially coupled to and freely separable from the front frame and a rear wheel pivotally coupled to the rear frame; a folding mechanism comprising a first folding element coupled to the front frame, a third folding element coupled to the rear frame, and a second folding element pivotally coupled to and freely rotatable about the first folding element and the third folding element, allowing the folding mechanism to be received in at least one of the front frame and the rear frame by coupling the front body and the rear body axially so as to enable axial alignment of the first folding element and the third folding element, allowing the folding mechanism to be partially exposed from at least one of the front frame and the rear frame by separating the front frame from the rear frame so as to fold up the folding bicycle, and allowing the front wheel and the rear wheel to be parallel by positioning the first folding element and the third folding element in parallel; and a fastening mechanism for fastening the folding mechanism to at least one of the front frame and the rear frame so as for the front frame and the rear frame to be coupled together axially and firmly, and allowing the folding mechanism to be received in at least one of the front frame and the rear frame.

The first, third, and second folding elements have a first pivot portion, a fourth pivot portion, and second and third pivot portions, respectively. The first pivot portion is corresponding in position and shape to the second pivot portion, and the fourth pivot portion is corresponding in position and shape to the third pivot portion, allowing the first pivot portion to be pivotally coupled to and freely rotatable about the second pivot portion of the second folding element, and allowing the fourth pivot portion to be pivotally coupled to and freely rotatable about the third pivot portion of the second folding element.

The first folding element is fixedly coupled to an end of the front frame, wherein the end is where the front frame and the rear frame join; and the second folding element and the third folding element are freely slidable so as to be received in or exposed from an end of the rear frame, wherein the end is where the rear frame and the front frame join. The third folding element is fixedly coupled to an end of the rear frame, wherein the end is where the rear frame and the front frame join; and the first folding element and the second folding element are freely slidable so as to be received in or exposed from an end of the front frame, wherein the end is where the front frame and the rear frame join. The first folding element is freely slidable so as to be received in or exposed from an end of the front frame, wherein the end is where the front frame and the rear frame join; and the second folding element and the third folding element are freely slidable so as to be received in or exposed from an end of the rear frame, wherein the end is where the rear frame and the front frame join.

The folding mechanism further comprises a position-limiting structure comprising a positioning block disposed on the first folding element and a position-limiting slot formed in the front frame, allowing the positioning block to be slidable along the position-limiting slot so as for a sliding travel of the first folding element to be limited by the position-limiting slot. Alternatively, the folding mechanism further comprises a position-limiting structure comprising a positioning block disposed on the third folding element and a position-limiting slot formed in the rear frame, allowing the positioning block to be slidable along the position-limiting slot so as for a sliding travel of the third folding element to be limited by the position-limiting slot. Alternatively, the folding mechanism further comprises a first position-limiting structure and a second position-limiting structure. The first position-limiting structure comprises a first positioning block disposed on the first folding element and a first position-limiting slot formed in the front frame, and the second position-limiting structure comprises a second positioning block disposed on the third folding element and a second position-limiting slot formed in the rear frame, allowing the first and second positioning blocks to be slidable along the first and second position-limiting slots so as for a sliding travel of the first and third folding elements to be limited by the first and second position-limiting slots, respectively.

The fastening mechanism comprises a fastener assembly disposed on the front frame or the rear frame and a hook assembly disposed on the rear frame or the front frame for fastening and separating the front frame and rear frame. The fastener assembly comprises a frame and a traverse rod disposed in the frame. The hook assembly comprises a handle pivotally coupled to and freely rotatable about the rear frame and a hooked rod pivotally coupled to and freely rotatable about the handle, in which the hooked rod has a hook portion, allowing the handle to be pushed and turned so as for the hook portion of the hooked rod to be coupled to a traverse rod of the fastener assembly to fasten the fastener assembly to the hook assembly, and allowing the hook portion of the hooked rod to be disconnected from the traverse rod of the fastener assembly to unfasten the fastener assembly from the hook assembly.

An end of the front frame has a first coupling portion, and an end of the rear frame has a second coupling portion corresponding in position and shape to the first coupling portion. The first coupling portion is convex or concave. The second coupling portion matches the first coupling portion by being concave or convex. The rear body is further provided with an auxiliary handle.

The folding bicycle further comprises a fold securing mechanism for securing in position the front body and the rear body while the front wheel and the rear wheel are parallel. The fold securing mechanism is an S-shaped hook.

BRIEF DESCRIPTION OF THE DRAWINGS

FIGS. 4A and 4B are cross-sectional views of a folding mechanism for the folding bicycle unfolded according to the present invention;

FIG. 4A' is a cross-sectional view of another embodiment of the folding mechanism shown in FIG. 4A according to the present invention;

DETAILED DESCRIPTION OF THE EMBODIMENTS

The present invention is herein illustrated with specific embodiments, so that one skilled in the pertinent art can easily understand other advantages and effects of the present invention from the disclosure of the invention.

Figure 1A:
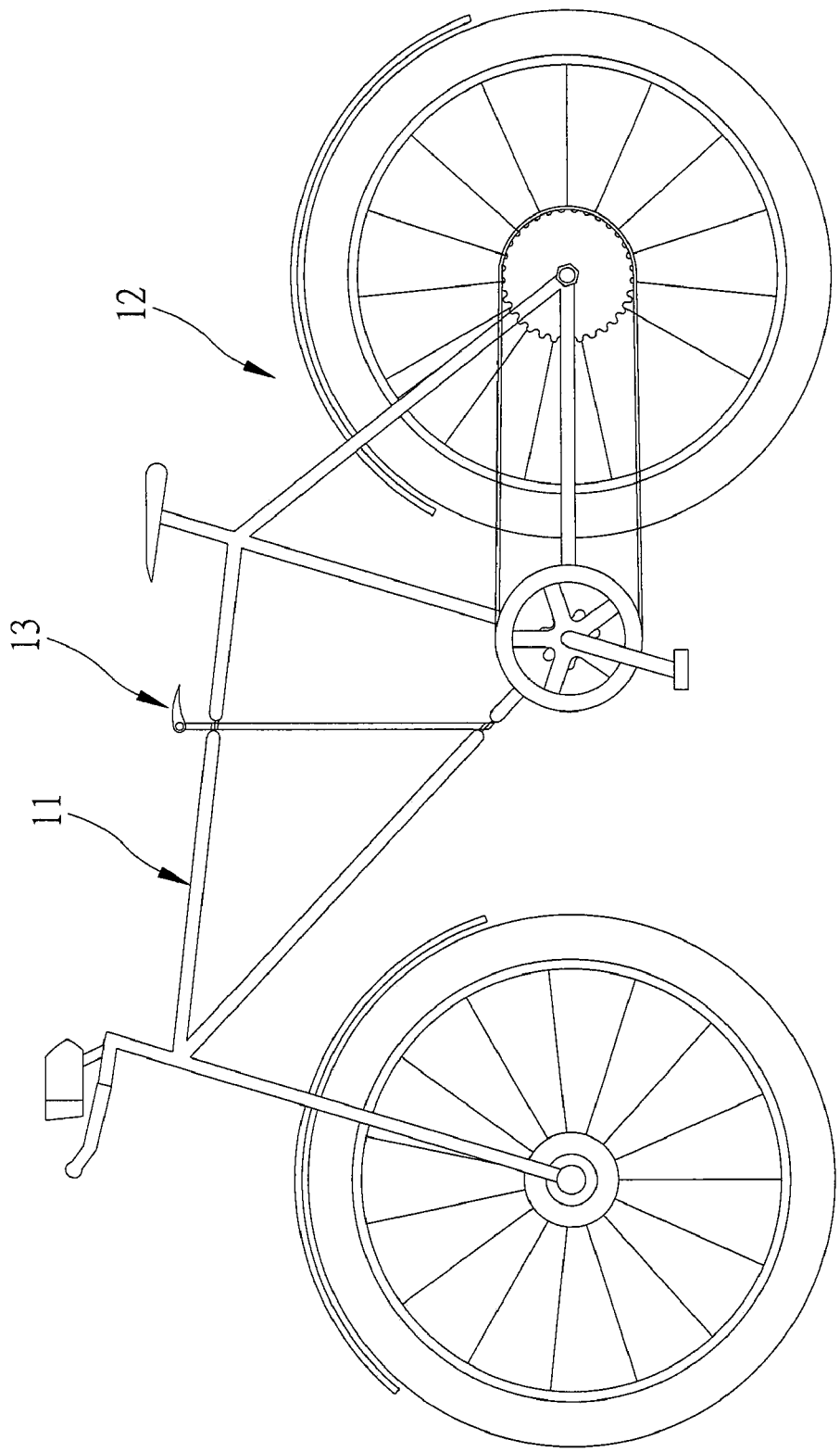
FIGS. 1A and 1B are schematic views of a conventional folding bicycle unfolded and folded, respectively.
Figure 1B:
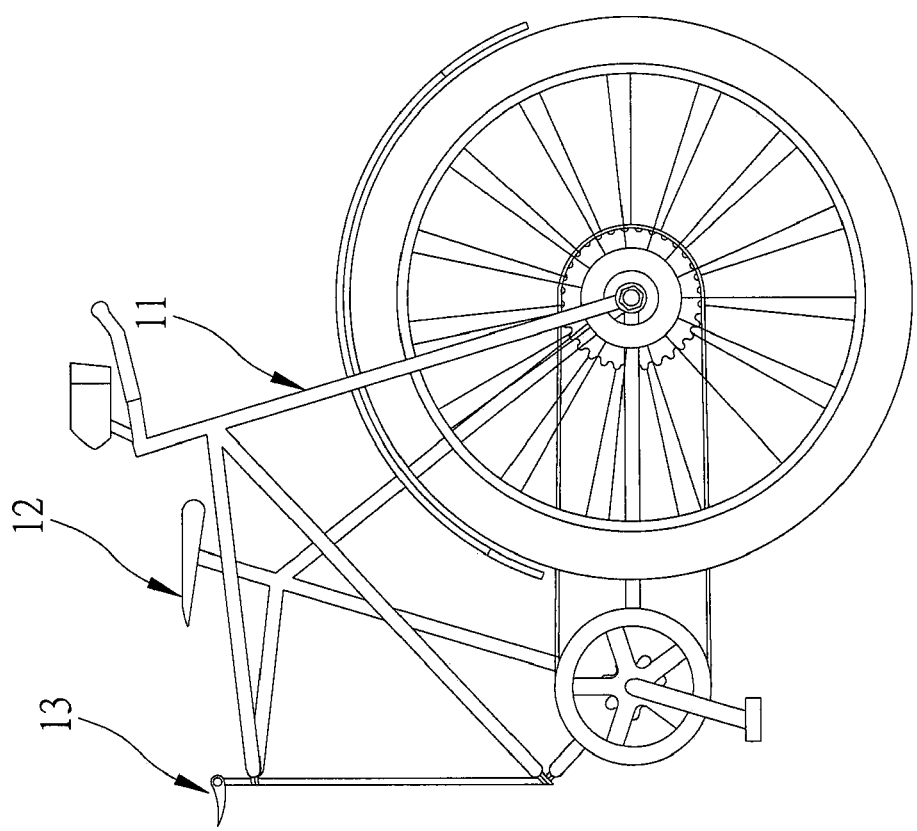
Figure 2:
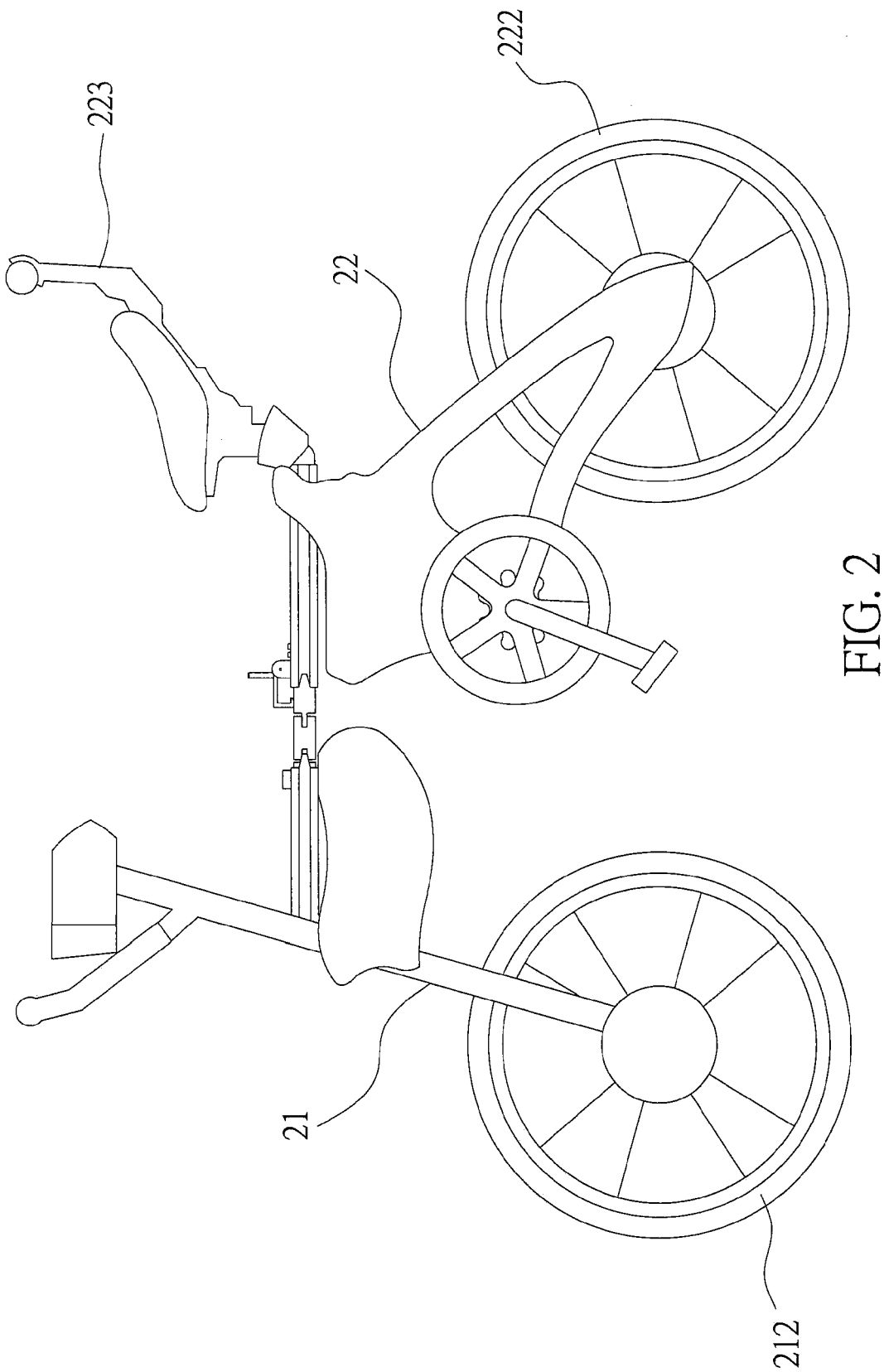
FIG. 2 is a schematic side view of a folding bicycle unfolded according to the present invention.
Figure 3:
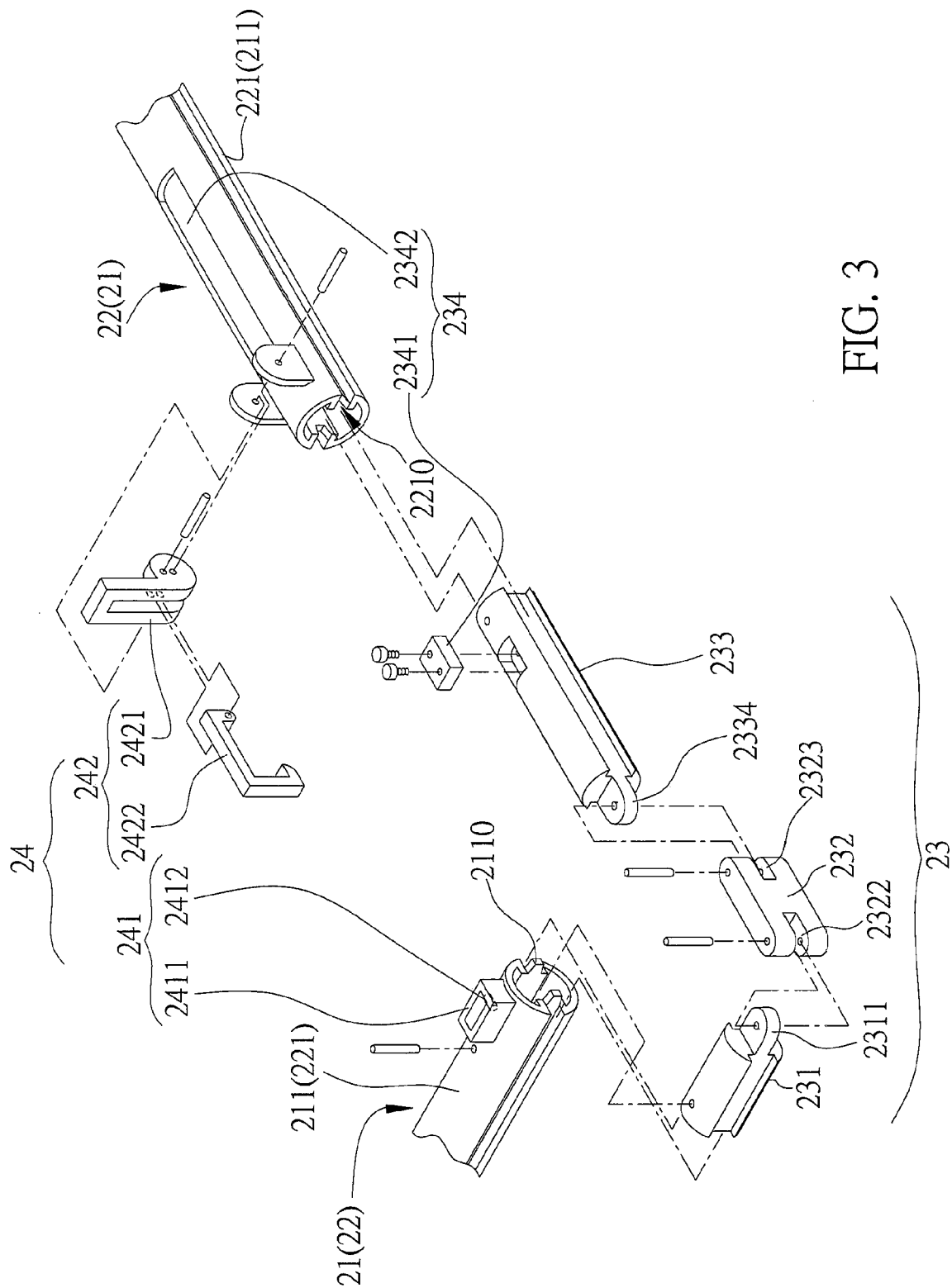
FIG. 3 is a partial exploded view of the folding bicycle of the present invention.

Referring to FIGS. 2 and 3, which are a schematic side view of a folding bicycle unfolded according to the present invention and a partial exploded view of the folding bicycle, respectively. The folding bicycle comprises a front body 21, a rear body 22, a folding mechanism 23, a fastening mechanism 24, and a fold securing mechanism.

The front body 21 comprises a front frame 211 with a convex or concave first coupling portion 2110 at the end thereof and a front wheel 212 pivotally coupled to the front frame 211.

The rear body 22 comprises a rear frame 221 axially coupled to and freely separable from the front frame 211 and a rear wheel 222 pivotally coupled to the rear frame 221. At the end of the rear frame 221 is a second coupling portion 2210 thereof. The second coupling portion 2210 matches the first coupling portion 2110 by being concave or convex. The rear body 22 is further provided with an auxiliary handle 223.

The folding mechanism 23 comprises a first folding element 231 coupled to the front frame 211, a third folding element 233 coupled to the rear frame 221, and a second folding element 232 pivotally coupled to and freely rotatable about the first folding element 231 and the third folding element 233. The front body 21 is coupled to the rear body 22 axially so that the folding mechanism 23 is received in at least one of the front frame 211 and the rear frame 221 and thereby the first folding element 231 and the third folding element 233 are aligned axially. On the other hand, the front frame 211 is separated from the rear frame 221 so as to fold up the folding bicycle, and therefore the folding mechanism 23 is partially exposed from at least one of the front frame 211 and the rear frame 221, thereby allowing the front wheel 212 and the rear wheel 222 to be parallel by positioning the first folding element 231 and the third folding element 233 in parallel.

The fold securing mechanism (not shown) secures in position the front body 21 and the rear body 22 while the front wheel 212 and the rear wheel 222 are parallel. The fold securing mechanism is preferably an S-shaped hook. Detailed description of the fold securing mechanism is omitted herein, as the production of S-shaped hooks is a mature and well-known technology.

Figure 4A:
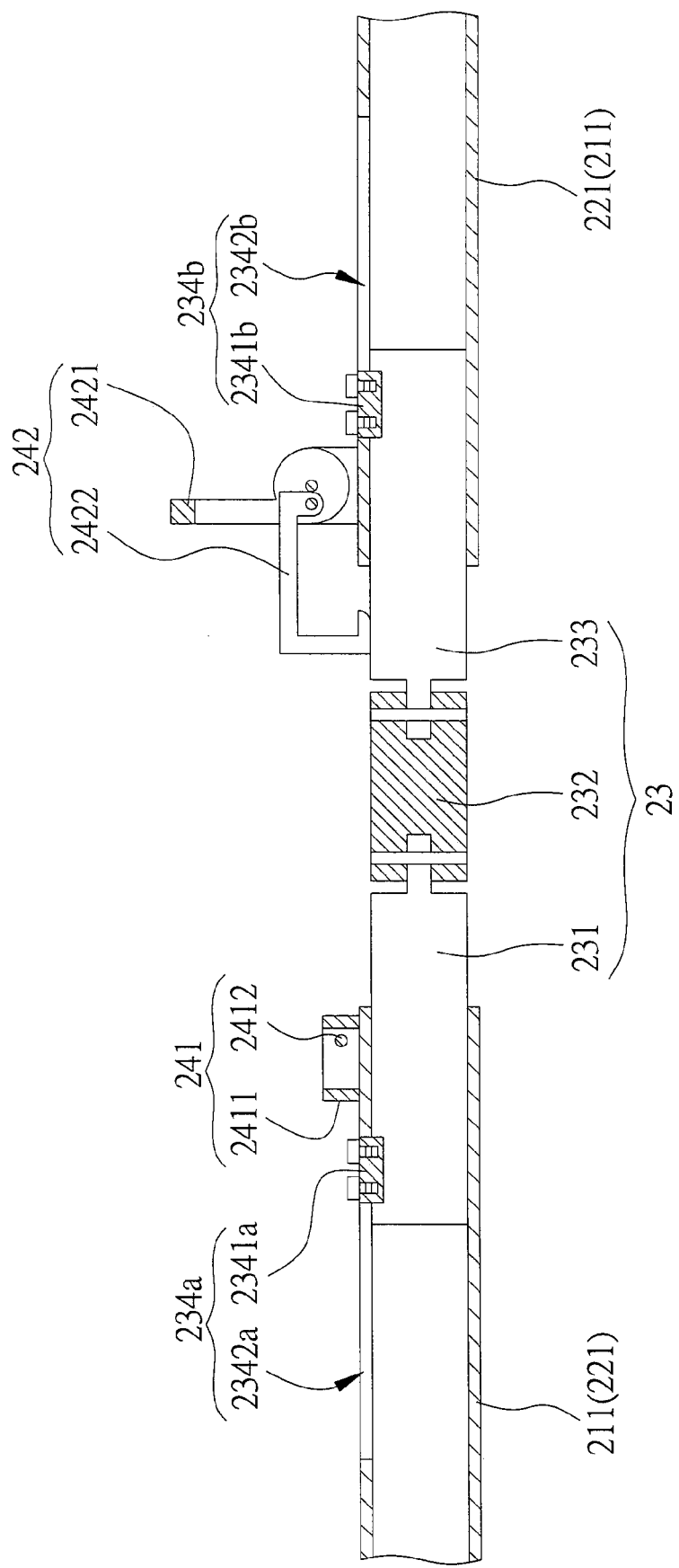

Referring to FIG. 4A, the first folding element 231 is fixedly inserted into the front frame 211, leaving one end of the first folding element 231 exposed from the front frame 211. The exposed end of the first folding element 231 has a first pivot portion 2311. In other words, the first pivot portion 2311 is exposed from the front frame 211. The second folding element 232 has a second pivot portion 2322 corresponding in position and shape to the first pivot portion 2311 and a third pivot portion 2323. The first pivot portion 2311 is pivotally coupled to and freely rotatable about the second pivot portion 2322 of the second folding element 232. The third folding element 233 has a fourth pivot portion 2334 corresponding in position and shape to the third pivot portion 2323. The fourth pivot portion 2334 is pivotally coupled to and freely rotatable about the third pivot portion 2323 of the second folding element 232. The second folding element 232 and the third folding element 233 are receivable in and projectable from the rear frame 221. As shown in the drawing, the first pivot portion 2311 and the fourth pivot portion 2334 are each a single lug, whereas the second pivot portion 2322 and the third pivot portion 2323 are each a pair of lugs, for coupling the first folding element 231, the second folding element 232, and the third folding element 233 together. Alternatively, the first pivot portion 2311 and the fourth pivot portion 2334 are each a pair of lugs, whereas the second pivot portion 2322 and third pivot portion 2323 are each a single lug, for bringing the aforesaid coupling effect. The above-mentioned involves reverse arrangement and therefore is not depicted in the drawings for the sake of brevity.

In another embodiment of the folding mechanism 23, the third folding element 233 is fixedly inserted into the rear frame 221, leaving one end of the third folding element 233 exposed from the rear frame 221. The first folding element 231 and the second folding element 232 are receivable in and projectable from the front frame 211, thereby allowing the folding mechanism 23 to be received in the front frame 211 and the rear frame 221.

The folding mechanism 23 further comprises a position-limiting structure 234. The position-limiting structure 234 comprises a positioning block 2341 disposed on the third folding element 233 and a position-limiting slot 2342 formed in the rear frame 221. The positioning block 2341 is slidable along the position-limiting slot 2342 so as for a sliding travel of the third folding element 233 to be limited by the position-limiting slot 2342. Alternatively, the position-limiting structure 234 comprises the positioning block 2341 disposed on the first folding element 231 and the position-limiting slot 2342 formed in the front frame 211. The positioning block 2341 is slidable along the position-limiting slot 2342 so as for a sliding travel of the first folding element 233 to be limited by the position-limiting slot 2342.

Referring to FIG. 4A', which is a cross-sectional view of another embodiment of the folding mechanism 23 shown in FIG. 4A according to the present invention, a sliding travel of the first folding element 231 and the third folding element 233 is limited by a first position-limiting structure 234a and a second position-limiting structure 234b, respectively, so as for the folding mechanism 23 to be received in the front frame 211 and the rear frame 221.

The first folding element 231 is freely slidable so as to be received in or exposed from the front frame 211, whereas the second folding element 232 and the third folding element 233 are freely slidable so as to be received in or exposed from the rear frame 221. Alternatively, the first folding element 231 and the second folding element 232 are freely slidable so as to be received in or exposed from the front frame 211, whereas the third folding element 233 is freely slidable so as to be received in or exposed from the rear frame 221. Both allow the folding mechanism 23 to be received in the front frame 211 and the rear frame 221.

The first position-limiting structure 234a comprises a first positioning block 2341a disposed on the first folding element 231 and a first position-limiting slot 2342a formed in the front frame 211, allowing the first positioning block 2341a to be slidable along the first position-limiting slot 2341a so as for a sliding travel of the first folding element 231 to be limited by the first position-limiting slot 2341a. The second position-limiting structure 234b comprises a second positioning block 2341b disposed on the third folding element 233 and a second position-limiting slot 2342b formed in the rear frame 221, allowing the second positioning block 2341b to be slidable along the second position-limiting slot 2342b so as for a sliding travel of the third folding element 233 to be limited by the second position-limiting slot 2342b. Hence, the first folding element 231 and the third folding element 233 are slidable along the front frame 211 and the rear frame 221, respectively, so as for a sliding travel of the first folding element 231 and the third folding element 233 to be limited by the first position-limiting structure 234a and the second position-limiting structure 234b, respectively.

Referring to FIGS. 3 and 4A, the fastening mechanism 24 fastens the folding mechanism 23 to at least one of the front frame 211 and the rear frame 221 so as for the front frame 211 and the rear frame 221 to be coupled together axially and firmly, and allows the folding mechanism 23 to be received in at least one of the front frame 211 and the rear frame 221. Specifically speaking, the fastening mechanism 24 comprises a fastener assembly 241 disposed on the front frame 211 and a hook assembly 242 disposed on the rear frame 221. Alternatively, the fastening mechanism 24 comprises the fastener assembly 241 disposed on the rear frame 221 and the hook assembly 242 disposed on the front frame 211. The above-mentioned involves opposite arrangements that bring a fastening effect equally well. The fastener assembly 241 comprises a frame 2411 and a traverse rod 2412 disposed in the frame 2411. The hook assembly 242 comprises a handle 2421 pivotally coupled to and freely rotatable about the rear frame 221 (or the front frame 211) and a hooked rod 2422 pivotally coupled to and freely rotatable about the handle 2421. The hooked rod 2422 has a hook portion 24220.

The above description of the fastening mechanism 24 is intended to illustrate a preferred embodiment thereof rather than limit the disclosure contained in the present invention. For instance, a fastening effect is achieved by passing a pin through the front frame 211, the rear frame 221, and the folding mechanism 23. Alternatively, a positioning pin furnished with a resilient spring slides along the front frame 211 or the rear frame 221 resiliently and, more advantageously, protracts and retracts resiliently while being received in a positioning hole formed in the first folding element 231, the second folding element 232, and/or the third folding element 233 of the folding mechanism 23 (depending on how the folding mechanism 23 is received), so as to position the folding mechanism 23 and fastens the front frame 211 and the rear frame 221 together, thereby bringing a fastening effect as well.

The end of the first folding element 231, where the first folding element 231 and the front frame 211 join, has a male taper; and the inner wall of the front frame 211 has a female taper. Optionally, the end of the third folding element 233, where the third folding element 233 and the rear frame 221 join, has a male taper; and the inner wall of the rear frame 221 has a female taper. As a result, the tapers reinforce the fastening effect of receiving the folding mechanism 23 in the front frame 211 and the rear frame 221 by receiving the outwardly tapered first folding element 231 and/or the outwardly tapered third folding element 233 in the inwardly tapered front frame 211 and/or the inwardly tapered rear frame 221. The tapers are, for example, Morse tapers, Brown tapers, Jarno tapers, or milling machine standard tapers.

Referring to FIGS. 4A and 4B, the second folding element 232 and the third folding element 233 of the folding mechanism 23 are received in the rear frame 221 so as for the folding mechanism 23 to hide inside the rear frame 221. The positioning block 2341 of the position-limiting structure 234 is positioned deep down in the position-limiting slot 2342 (as shown on the right in FIG. 4A). The handle 2421 of the fastening mechanism 24 is turned toward the rear frame 221 so as for the hook portion 24220 of the hooked rod 2422 to be engaged and coupled with the traverse rod 2412 of the fastener assembly 241, thereby fastening the hook assembly 242 and the fastener assembly 241 together as shown in FIG. 4A. A convex portion 2110 of the front frame 211 engages with a concave portion 2210 of the rear frame 221 as shown in FIG. 4B, so as for the folding mechanism 23 to hide inside the rear frame 221, and in consequence the front frame 211 and the rear frame 221 are coupled together in an integrated and esthetic manner. Also, embedding the convex portion 2110 in the concave portion 2210 not only reinforces the bonding of the front frame 211 to the rear frame 221 but also keeps the front body 21 and the rear body 22 in a straight line, thereby dispensing with unreliable vision-based alignment and ensuring bicyclists' safety.

Figure 5:
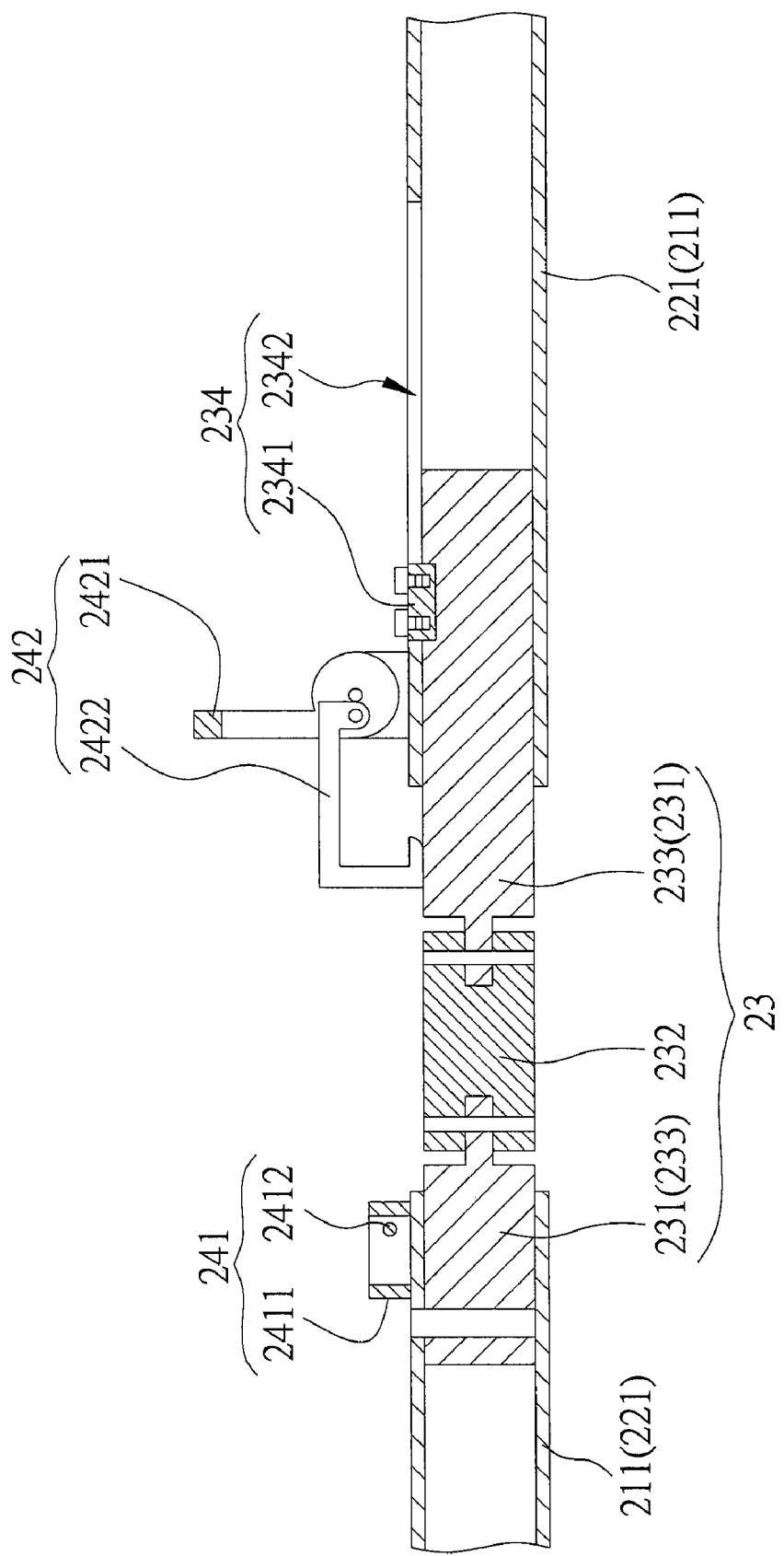
FIG. 5 is a cross-sectional view of the folding mechanism for the folding bicycle folded according to the present invention.

Referring to FIG. 5, to fold up the folding bicycle, pull the handle 2421 upward to disconnect the hook portion 24220 of the hooked rod 2422 from the traverse rod 2412 of the fastener assembly 241, and then push the front body 21 forward (or pull the rear body 22) to draw the second folding element 232 and the third folding element 233 from the rear frame 221. The folding process is made simpler as the positioning block 2341 of the position-limiting structure 234 is in the forefront of the position-limiting slot 2342 (as shown on the left in the drawing) and thereby capable of limiting a sliding travel of the third folding element 233.

Figure 6:
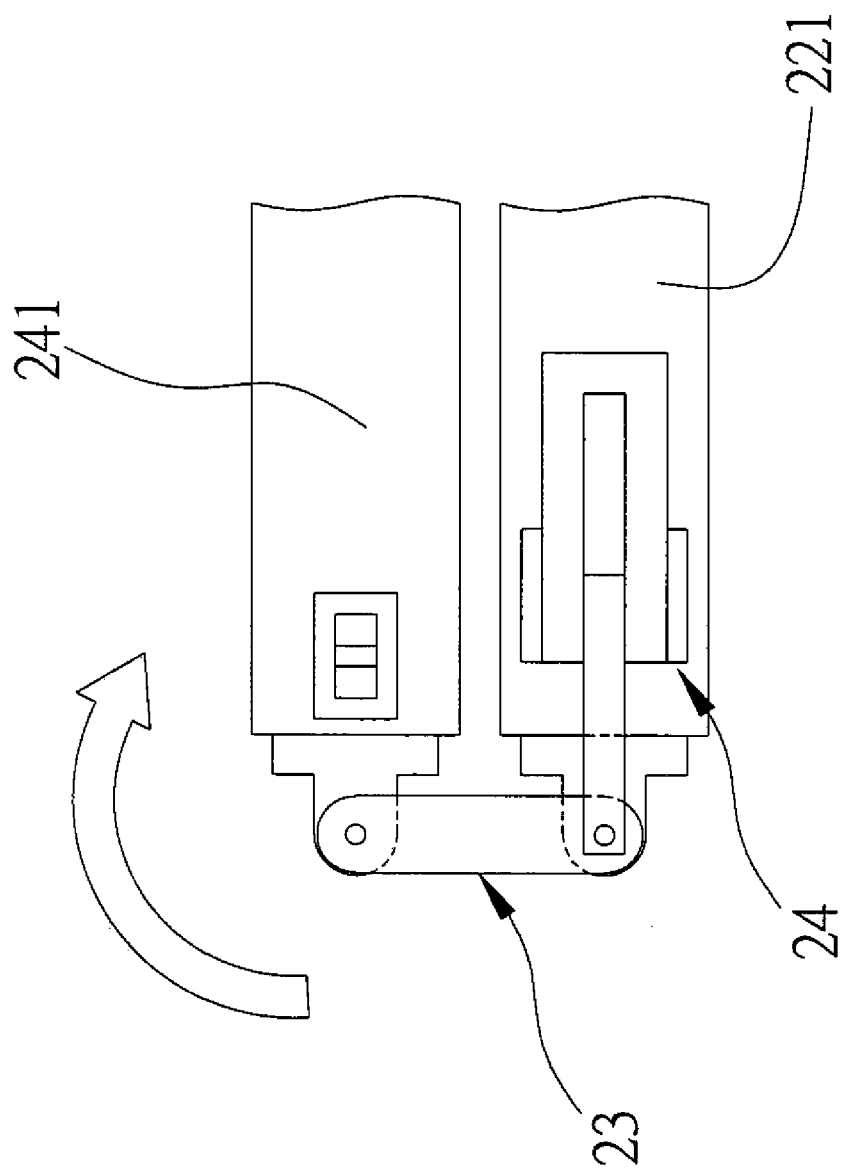
FIG. 6 is a partial schematic top view showing how to fold the folding bicycle with the folding mechanism according to the present invention.

Referring to FIG. 6, the front body 21 is flipped over to overlap the rear body 22 (or the rear body 22 is flipped over to overlap the front body 21) such that the front body 21 and the rear body 22 are drawn closer to each other; hence, the folded folding bicycle is compact enough to be transported or stored conveniently.

Figure 7:
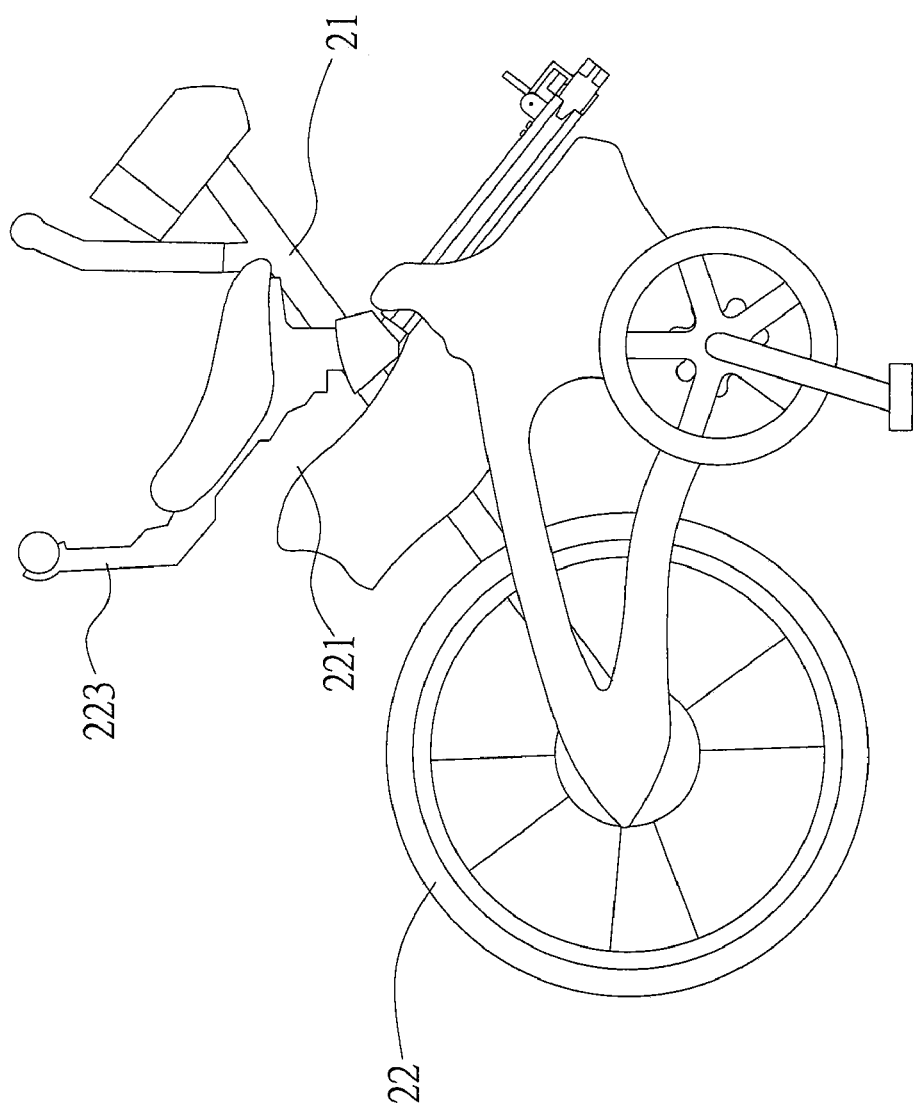
FIG. 7 is a schematic side view of the folding bicycle folded according to the present invention.

Referring to FIG. 7, the front body 21 and rear body 22 are drawn closer to each other so as for the front wheel 212 and the rear wheel 222 to be parallel, and thus a cyclist can easily push or pull the folded folding bicycle while holding the auxiliary handle 223 of the rear body 22.

A folding bicycle of the present invention comprises a folding mechanism receivable in at least one of a front frame and a rear frame so as for the folding mechanism to be concealable and therefore conducive to integrity and esthetic appearance of the folding bicycle. A convex portion of the front frame can be embedded in a concave portion of the rear frame so as to enhance the bonding of the front body to the rear body and keep the front body and the rear body in a straight line, thereby dispensing with unreliable vision-based alignment and ensuring bicyclists' safety.

The foregoing specific embodiments are only illustrative of the features and functions of the present invention but are not intended to restrict the scope of the present invention. It is apparent to those skilled in the art that all equivalent modifications and variations made in the foregoing embodiments according to the spirit and principle in the disclosure of the present invention should fall within the scope of the appended claims.

What is claimed is:

1. A folding bicycle, comprising:
a front body comprising a front frame and a front wheel pivotally coupled to the front frame;
a rear body comprises a rear frame axially coupled to and freely separable from the front frame and a rear wheel pivotally coupled to the rear frame;
a folding mechanism comprising a first folding element coupled to the front frame, a third folding element coupled to the rear frame, and a second folding element pivotally coupled to and freely rotatable about the first folding element and the third folding element, allowing the folding mechanism to be received in at least one of the front frame and the rear frame by coupling the front body and the rear body axially so as to enable axial alignment of the first folding element and the third folding element, allowing the folding mechanism to be partially exposed from at least one of the front frame and the rear frame by separating the front frame from the rear frame so as to fold up the folding bicycle, and allowing the front wheel and the rear wheel to be parallel by positioning the first folding element and the third folding element in parallel; and
a fastening mechanism for fastening the folding mechanism to at least one of the front frame and the rear frame so as for the front frame and the rear frame to be coupled together axially and firmly, and allowing the folding mechanism to be received in at least one of the front frame and the rear frame when the front frame and the rear frame are axially coupled.

2. The folding bicycle of claim 1, wherein the first, third, and second folding elements have a first pivot portion, a fourth pivot portion, and second and third pivot portions, respectively, in which the first pivot portion is corresponding in position and shape to the second pivot portion, and the fourth pivot portion is corresponding in position and shape to the third pivot portion, allowing the first pivot portion to be pivotally coupled to and freely rotatable about the second pivot portion, and allowing the fourth pivot portion to be pivotally coupled to and freely rotatable about the third pivot portion.

3. The folding bicycle of claim 1, wherein the first folding element is fixedly coupled to an end of the front frame, the end being where the front frame and the rear frame join, and the second folding element and the third folding element are freely slidable so as to be received in or exposed from an end of the rear frame, the end being where the rear frame and the front frame join.

4. The folding bicycle of claim 1, wherein the third folding element is fixedly coupled to an end of the rear frame, the end being where the rear frame and the front frame join, and the first folding element and the second folding element are freely slidable so as to be received in or exposed from an end of the front frame, the end being where the front frame and the rear frame join.

5. The folding bicycle of claim 1, wherein the first folding element is freely slidable so as to be received in or exposed from an end of the front frame, the end being where the front frame and the rear frame join, and the second folding element and the third folding element are freely slidable so as to be received in or exposed from an end of the rear frame, the end being where the rear frame and the front frame join.

6. The folding bicycle of claim 1, wherein the first folding element and the second folding element are freely slidable so as received in or exposed from an end of the front frame, the end being where the front frame and the rear frame join, and the third folding element is freely slidable so as to be received in or exposed from an end of the rear frame, the end being where the rear frame and the front frame join.

7. The folding bicycle of claim 1, wherein the folding mechanism further comprises a position-limiting structure comprising a positioning block disposed on the first folding element and a position-limiting slot formed in the front frame, allowing the positioning block to be slidable along the position-limiting slot so as for a sliding travel of the first folding element to be limited by the position-limiting slot.

8. The folding bicycle of claim 1, wherein the folding mechanism further comprises a position-limiting structure comprising a positioning block disposed on the third folding element and a position-limiting slot formed in the rear frame, allowing the positioning block to be slidable along the position-limiting slot so as for a sliding travel of the third folding element to be limited by the position-limiting slot.

9. The folding bicycle of claim 1, wherein the folding mechanism further comprises a first position-limiting structure and a second position-limiting structure, in which the first position-limiting structure comprises a first positioning block disposed on the first folding element and a first position-limiting slot formed in the front frame, and the second position-limiting structure comprises a second positioning block disposed on the third folding element and a second position-limiting slot formed in the rear frame, allowing the first and second positioning blocks to be slidable along the first and second position-limiting slots so as for a sliding travel of the first and third folding elements to be limited by the first and second position-limiting slots, respectively.

10. The folding bicycle of claim 1, wherein the fastening mechanism comprises a fastener assembly disposed on the front frame or the rear frame and a hook assembly disposed on the rear frame or the front frame for fastening and separating the front frame and rear frame.

11. The folding bicycle of claim 10, wherein the fastener assembly comprises a frame and a traverse rod disposed in the frame.

12. The folding bicycle of claim 10, wherein the hook assembly comprises a handle pivotally coupled to and freely rotatable about the rear frame and a hooked rod pivotally coupled to and freely rotatable about the handle, in which the hooked rod has a hook portion, allowing the handle to be pushed and turned so as for the hook portion of the hooked rod to be coupled to a traverse rod of the fastener assembly to fasten the fastener assembly to the hook assembly, and allowing the hook portion of the hooked rod to be disconnected from the traverse rod of the fastener assembly to unfasten the fastener assembly from the hook assembly.

13. The folding bicycle of claim 1, wherein an end of the front frame has a first coupling portion, and an end of the rear frame has a second coupling portion corresponding in position and shape to the first coupling portion.

14. The folding bicycle of claim 13, wherein the first coupling portion is convex or concave.

15. The folding bicycle of claim 14, wherein the second coupling portion matches the first coupling portion by being concave or convex.

16. The folding bicycle of claim 1, wherein the rear body is further provided with an auxiliary handle.

17. The folding bicycle of claim 1, further comprising a fold securing mechanism for securing in position the front body and the rear body while the front wheel and the rear wheel are parallel.

18. The folding bicycle of claim 17, wherein the fold securing mechanism is an S-shaped hook.

\* \* \* \* \*